US010057496B2

United States Patent
Shirakawa

(10) Patent No.: US 10,057,496 B2
(45) Date of Patent: Aug. 21, 2018

(54) DISPLAY CONTROL APPARATUS, DISPLAY CONTROL METHOD, AND PROGRAM

(71) Applicant: CANON KABUSHIKI KAISHA, Tokyo (JP)

(72) Inventor: Yusuke Shirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/118,057

(22) PCT Filed: Jan. 27, 2015

(86) PCT No.: PCT/JP2015/000347
§ 371 (c)(1),
(2) Date: Aug. 10, 2016

(87) PCT Pub. No.: WO2015/122128
PCT Pub. Date: Aug. 20, 2015

(65) Prior Publication Data
US 2017/0013200 A1    Jan. 12, 2017

(30) Foreign Application Priority Data

Feb. 13, 2014  (JP) .................................. 2014-025734

(51) Int. Cl.
*G01S 19/13*    (2010.01)
*G01S 19/42*    (2010.01)
(Continued)

(52) U.S. Cl.
CPC ....... *H04N 5/23293* (2013.01); *G01S 5/0263* (2013.01); *G01S 19/13* (2013.01);
(Continued)

(58) Field of Classification Search
CPC ............. H04N 5/5225; H04N 5/23216; H04N 5/23293; G01S 19/0263; G01S 19/39;
(Continued)

(56) References Cited

U.S. PATENT DOCUMENTS

| 8,264,570 B2* | 9/2012 | Karimoto | ............... H04N 1/222 |
| | | | 348/231.3 |
| 2008/0118100 A1* | 5/2008 | Hayashi | ............. H04N 1/32112 |
| | | | 382/100 |

(Continued)

FOREIGN PATENT DOCUMENTS

| JP | 2007323543 A | 12/2007 |
| JP | 2008082883 A | 4/2008 |

(Continued)

*Primary Examiner* — Lin Ye
*Assistant Examiner* — Marly Camargo
(74) *Attorney, Agent, or Firm* — Canon U.S.A., Inc. IP Division

(57) ABSTRACT

A display control apparatus includes a storage unit configured to store image data associated with positional information, a determination unit configured to determine whether information representing a type of satellite used for determining the positional information associated with the image data stored in the storage unit is associated with the image data, and a display control unit configured to control, in accordance with a result of the determination performed by the determination unit, display of information representing a type of satellite used for determining the positional information associated with the image data in a form in which the type of satellite is recognizable.

12 Claims, 13 Drawing Sheets

(51) Int. Cl.
*H04N 5/232* (2006.01)
*G06F 3/048* (2013.01)
*G01S 19/14* (2010.01)
*G01S 19/48* (2010.01)
*G01S 5/02* (2010.01)
*G06F 3/0481* (2013.01)
*G06F 3/0482* (2013.01)

(52) U.S. Cl.
CPC .............. *G01S 19/14* (2013.01); *G01S 19/42* (2013.01); *G01S 19/48* (2013.01); *G06F 3/048* (2013.01); *H04N 5/23216* (2013.01); *G06F 3/0482* (2013.01); *G06F 3/04817* (2013.01)

(58) Field of Classification Search
CPC .......... G01S 19/13; G01S 19/14; G01S 19/42; G01S 19/48; G01S 5/0263; G06F 3/048; G06F 3/04817; G06F 3/04815; G06F 3/04842

USPC .......... 348/333.02, 333.05, 333.12; 715/205, 715/835; 725/48, 63, 105

See application file for complete search history.

(56) References Cited

U.S. PATENT DOCUMENTS

2014/0344758 A1* 11/2014 Kozakura ......... G06F 17/30274 715/835
2018/0097980 A1* 4/2018 Nishimura ............. H04N 5/232

FOREIGN PATENT DOCUMENTS

| JP | 2012085169 A | 4/2012 |
| JP | 2013-050396 A | 3/2013 |
| JP | 2013-211059 A | 10/2013 |

* cited by examiner

[Fig. 1]
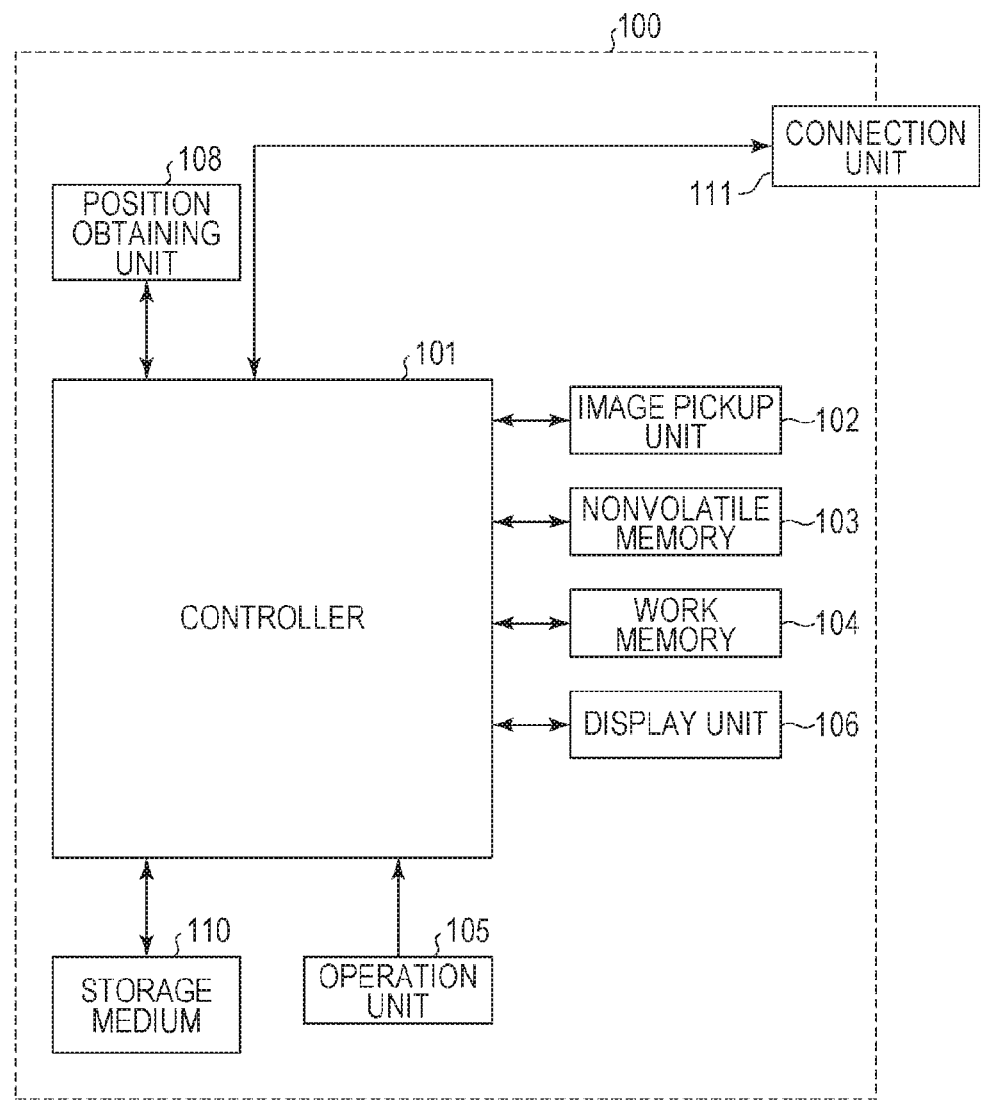

[Fig. 2]
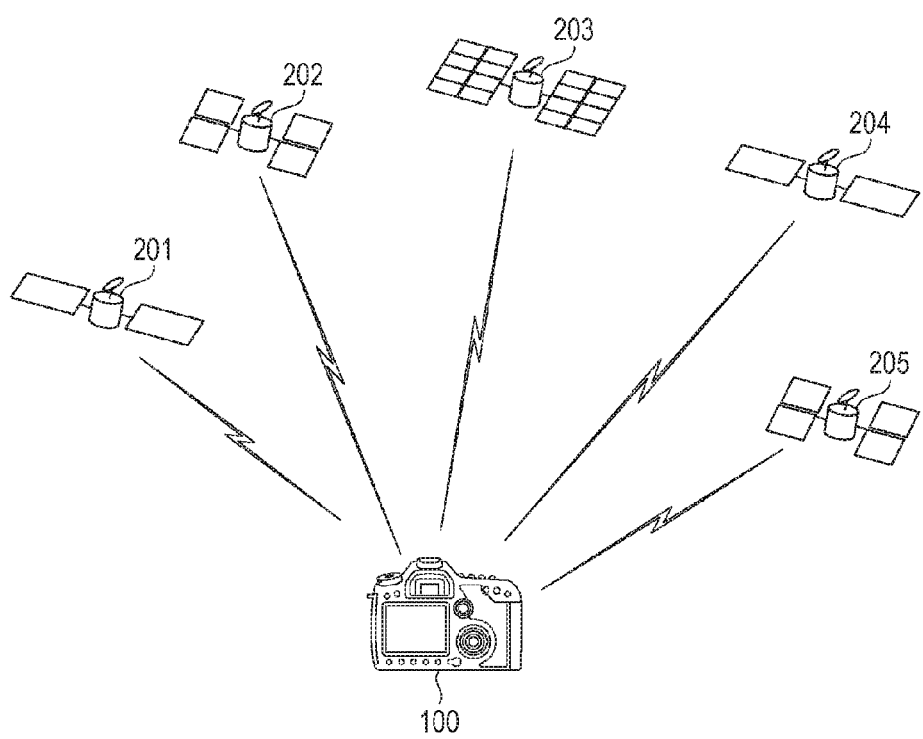

[Fig. 3A]
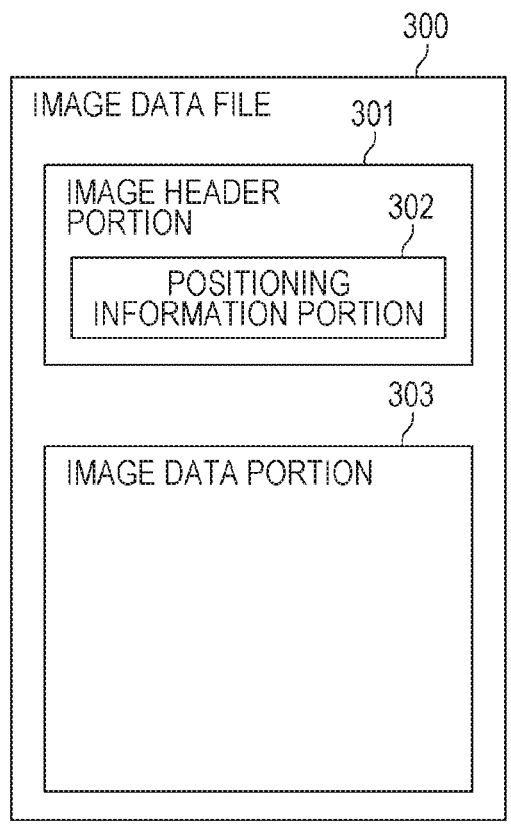
[Fig. 3B]
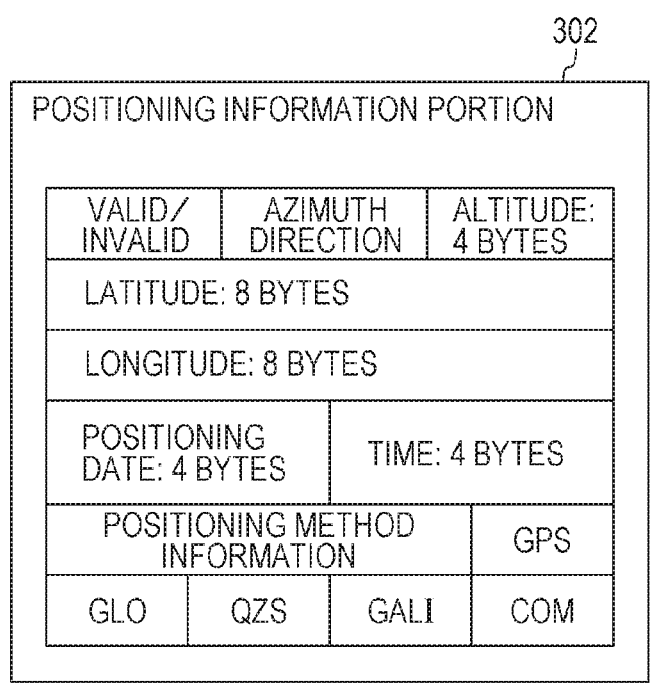

[Fig. 4A]
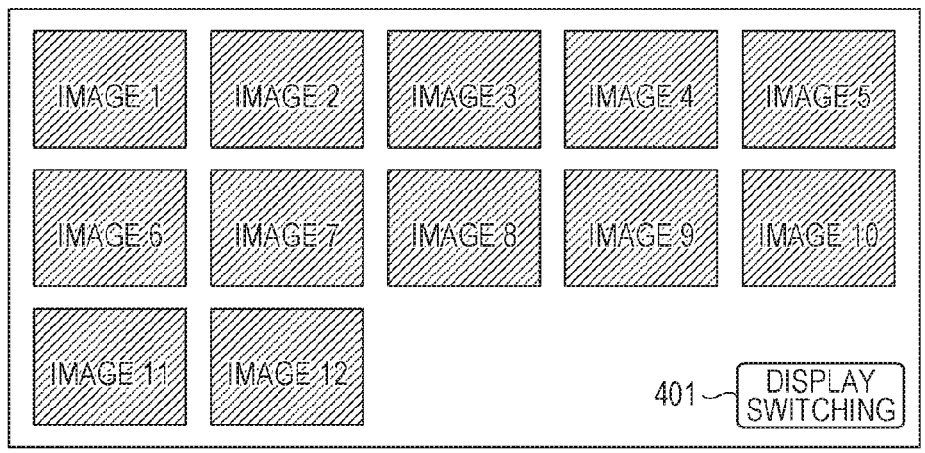
[Fig. 4B]
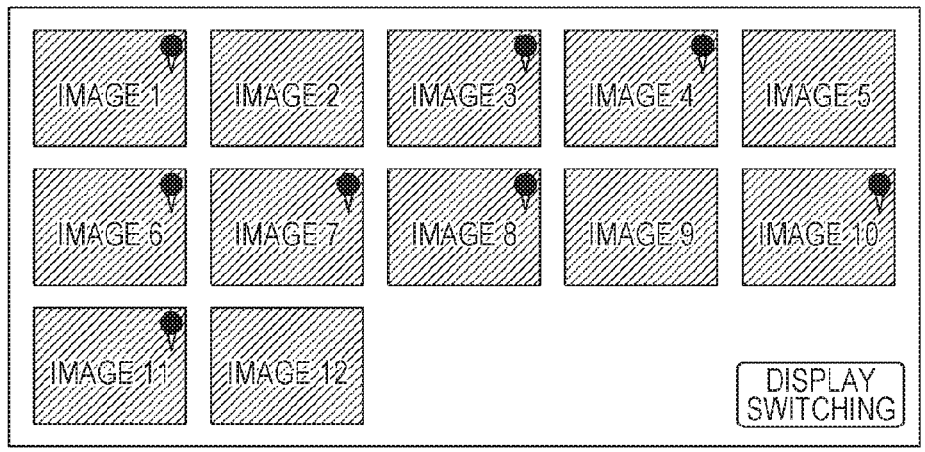
[Fig. 4C]
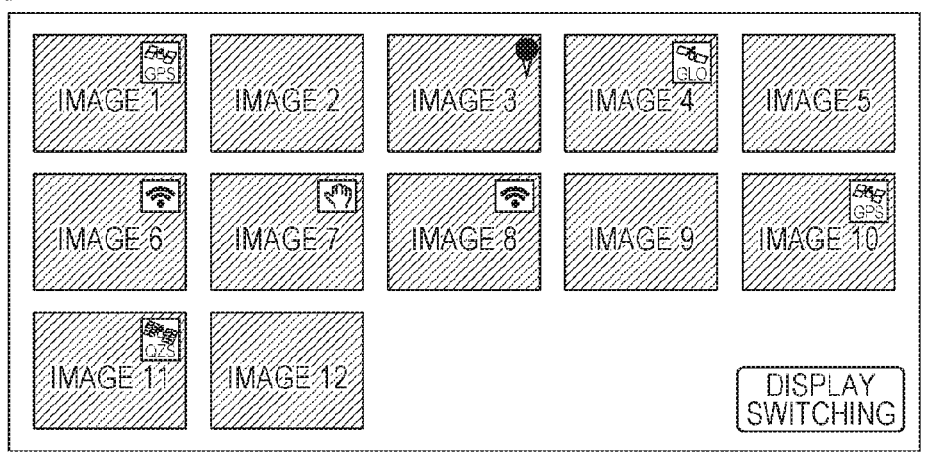

[Fig. 5]
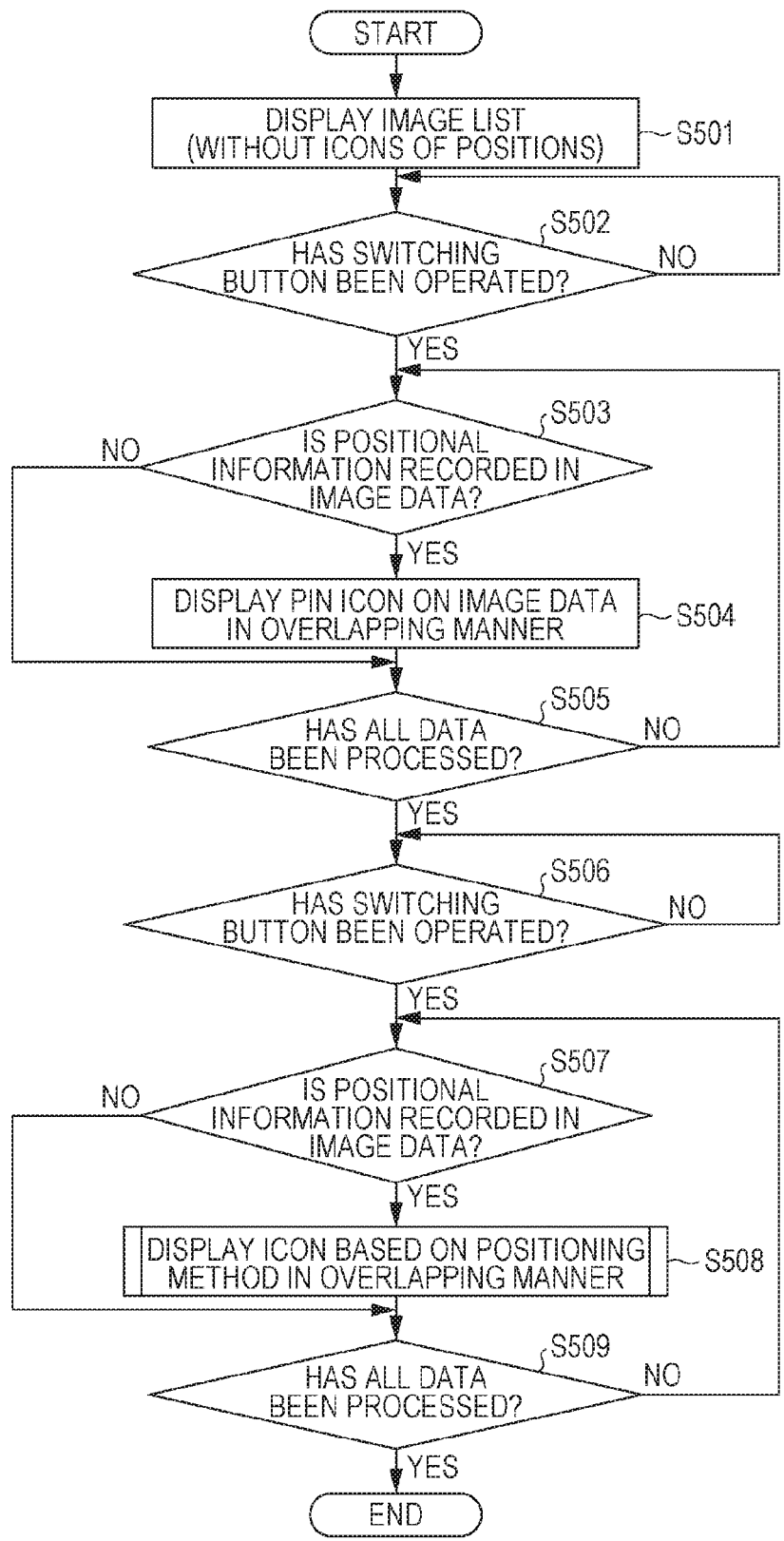

[Fig. 6]
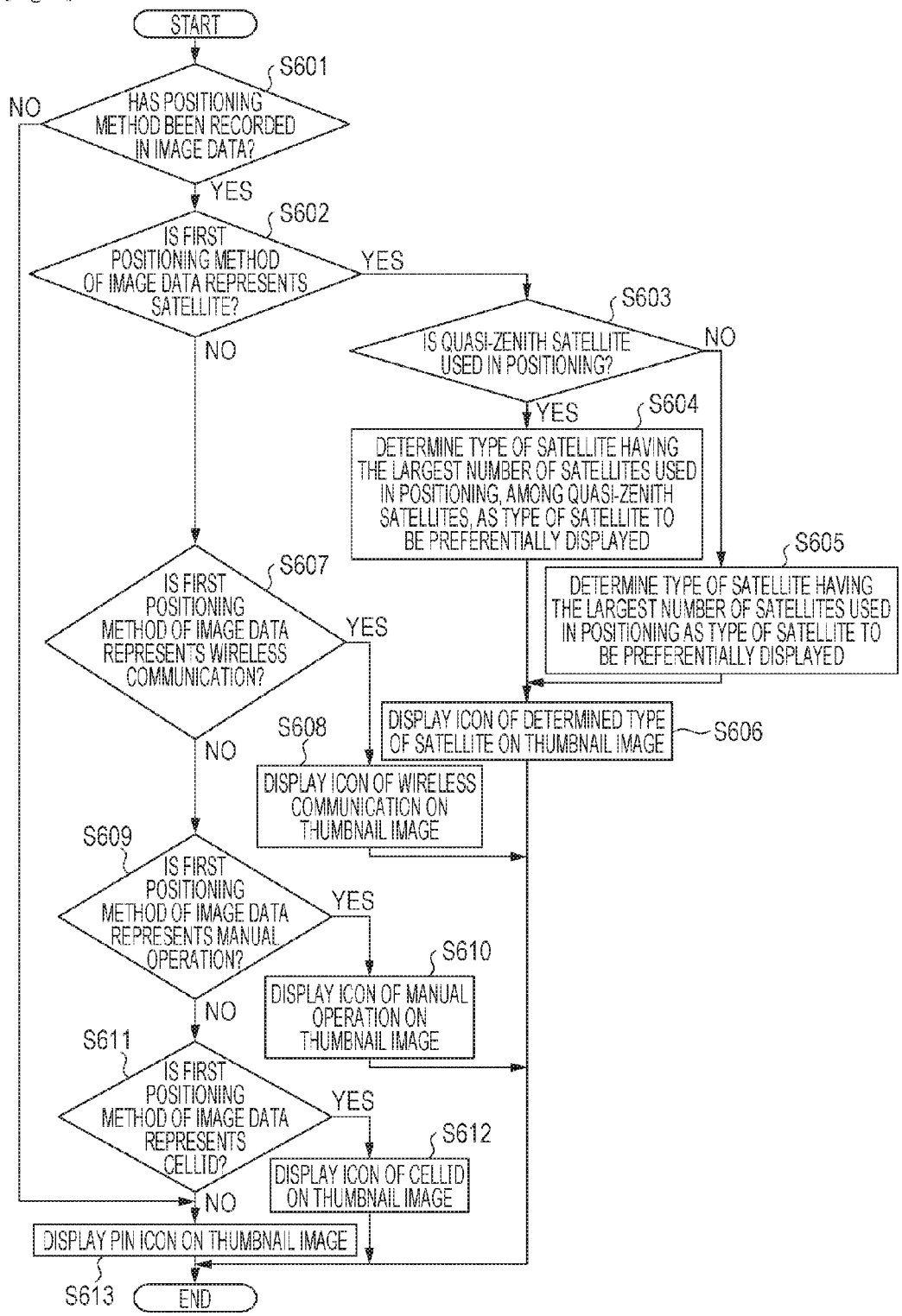

[Fig. 7A]
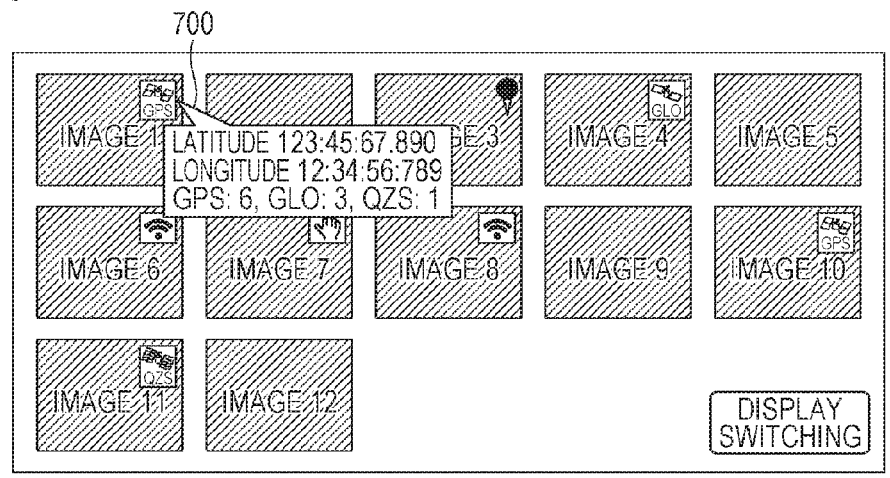
[Fig. 7B]
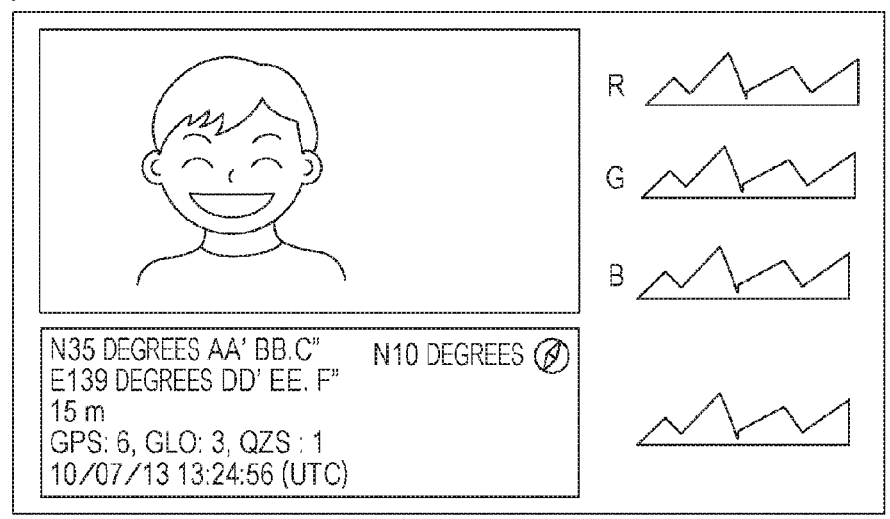
[Fig. 7C]
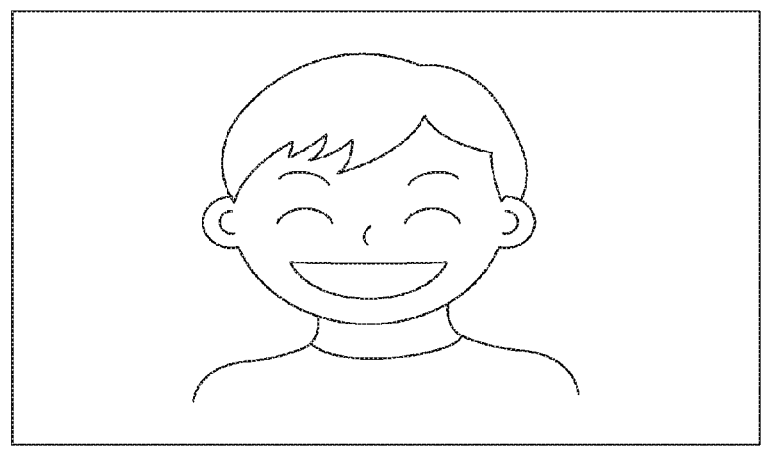

[Fig. 8A]
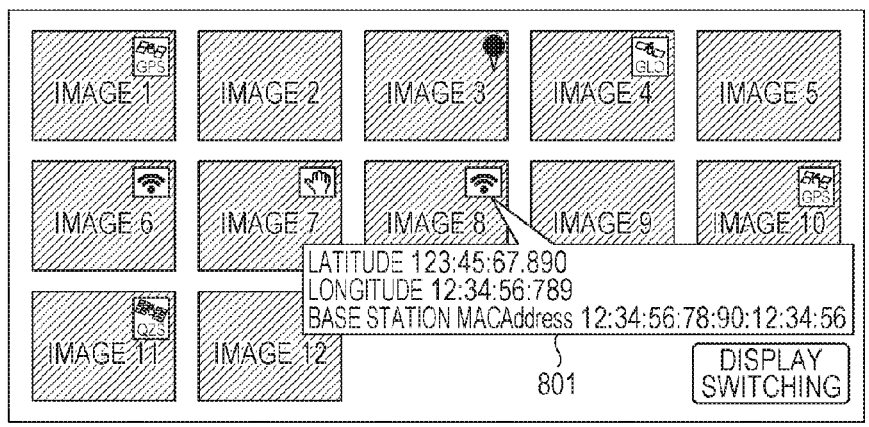
[Fig. 8B]
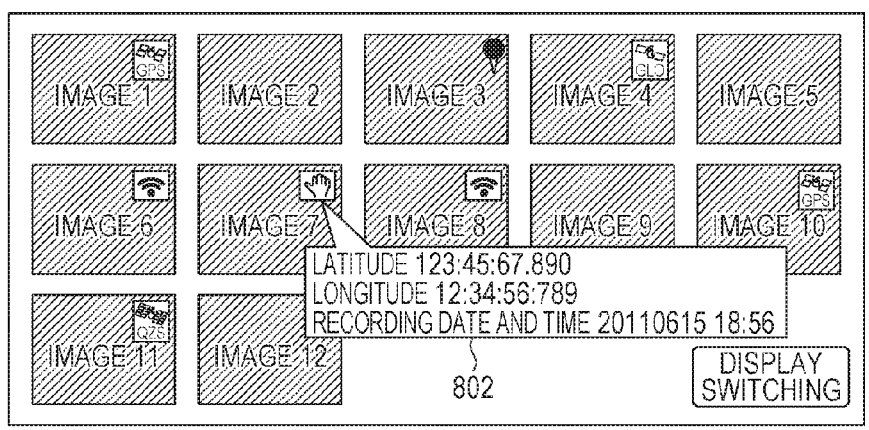
[Fig. 8C]
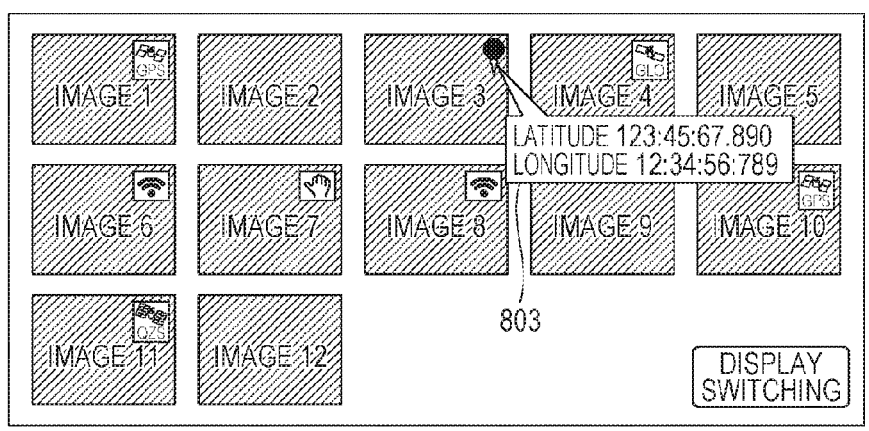

[Fig. 9]
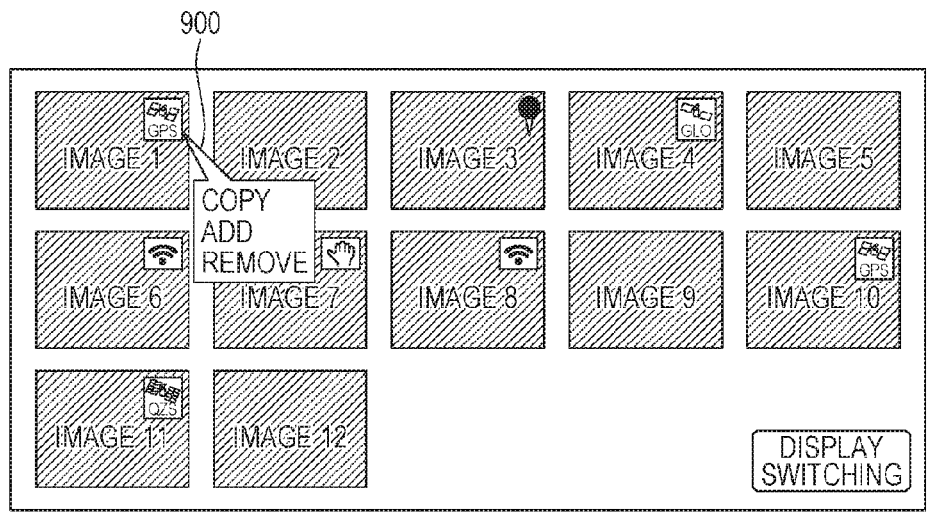
[Fig. 10]
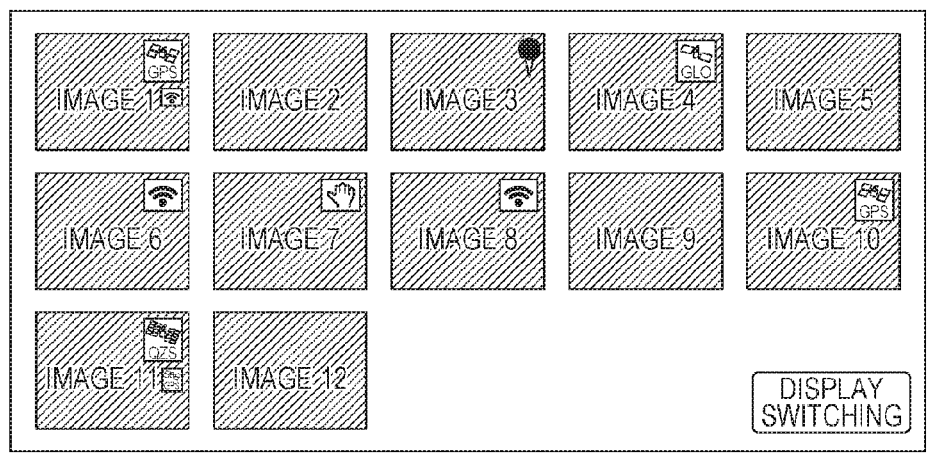

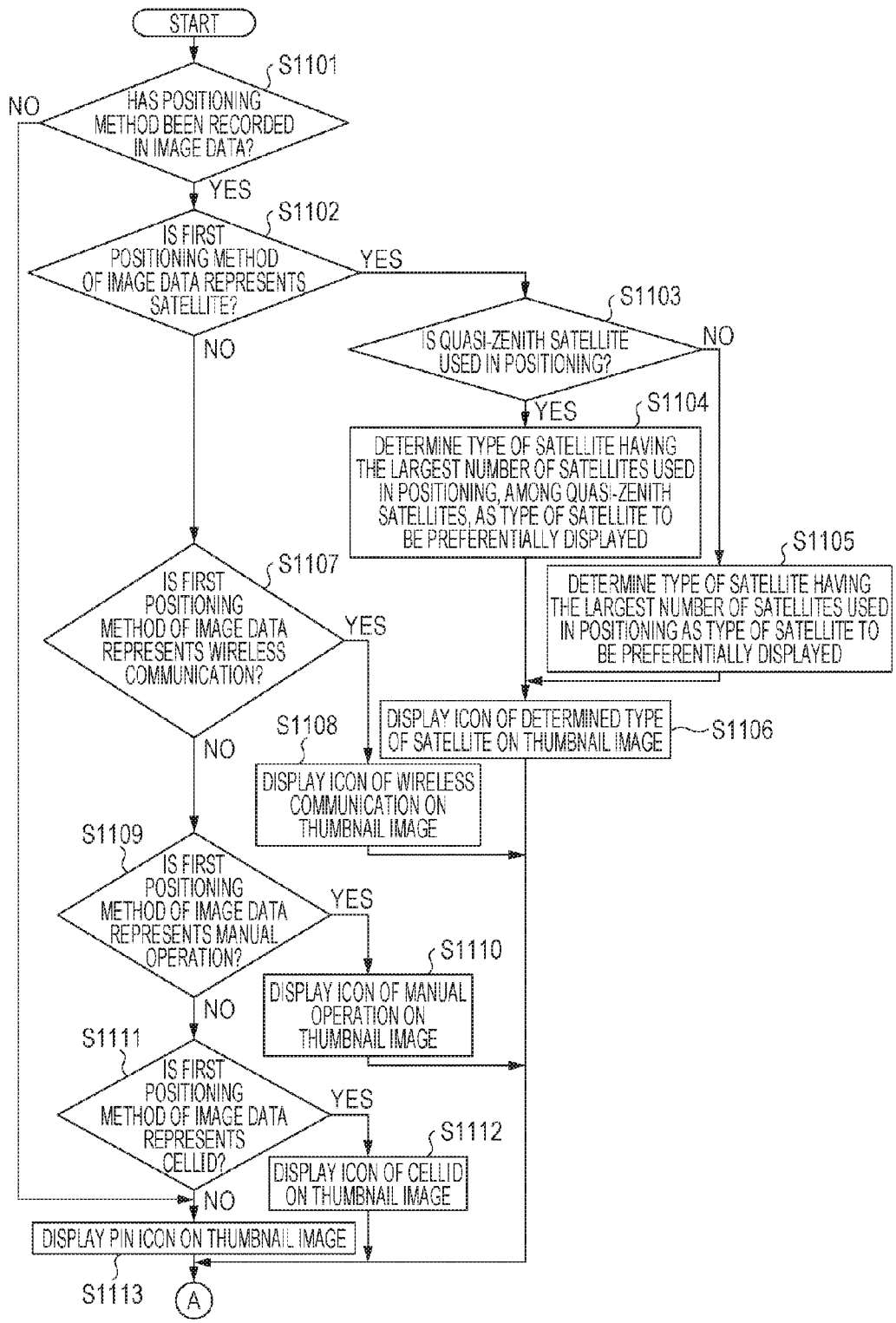

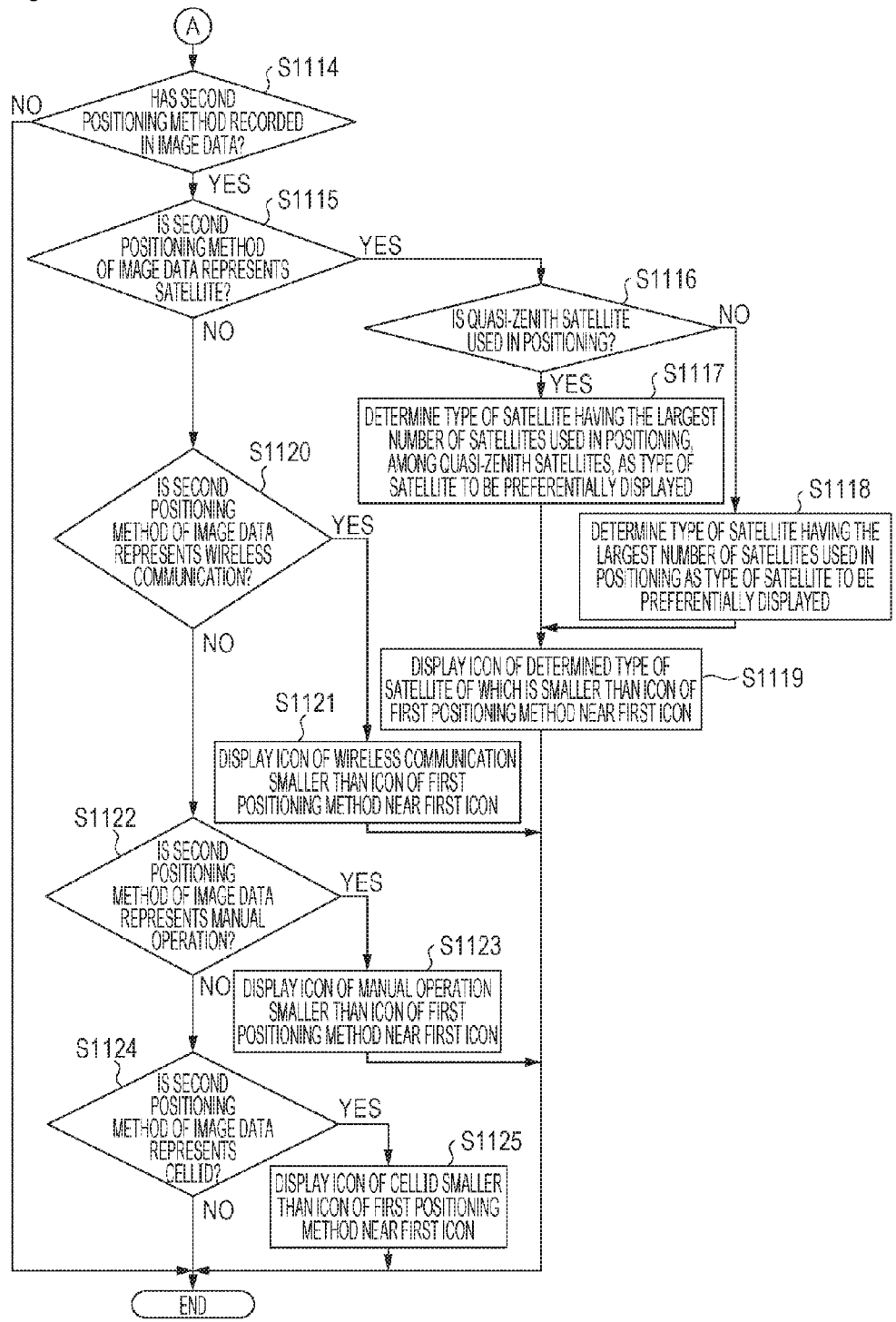

[Fig. 12A]
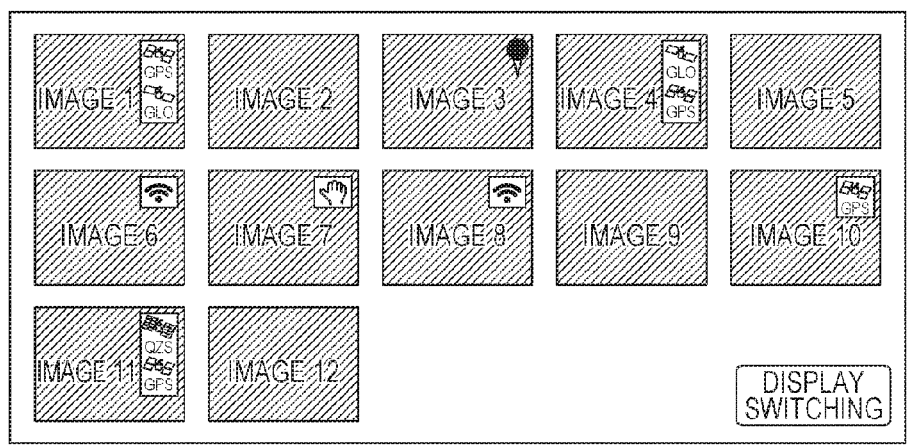
[Fig. 12B]
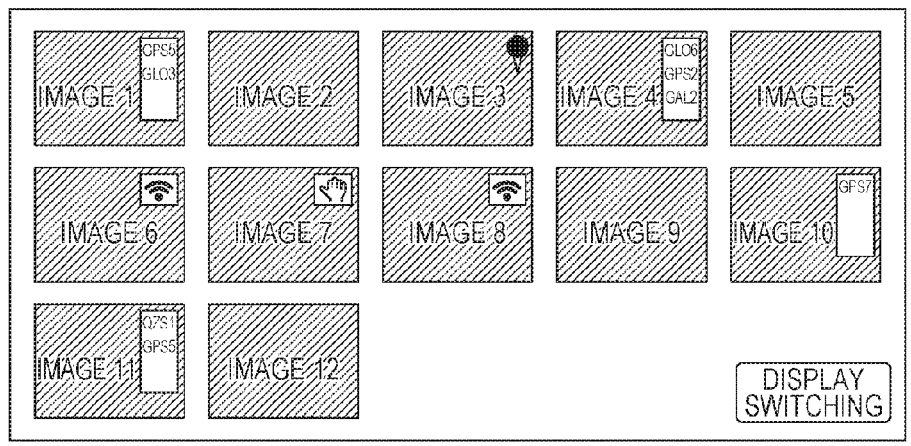

[Fig. 13]
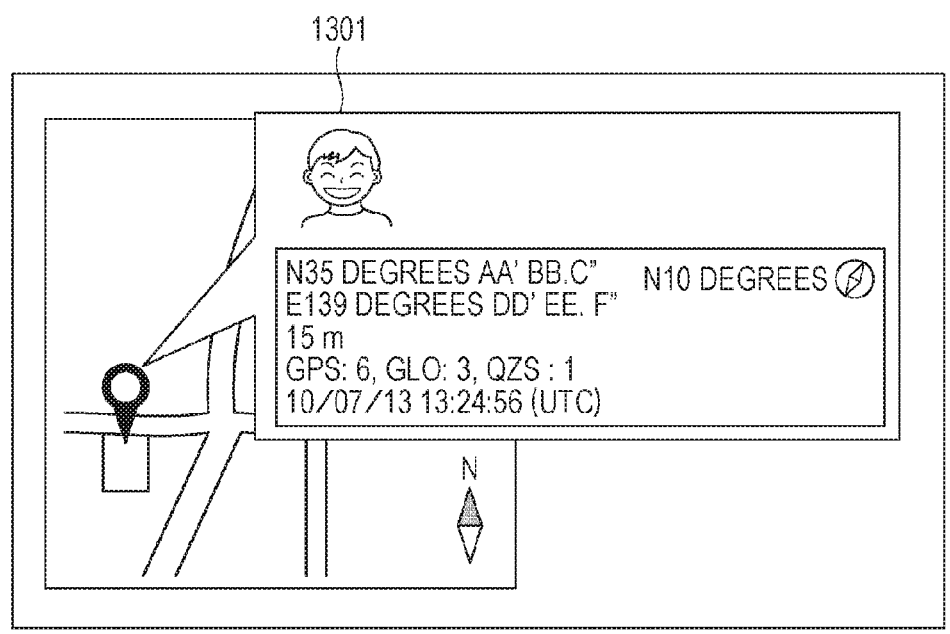

DISPLAY CONTROL APPARATUS, DISPLAY CONTROL METHOD, AND PROGRAM

TECHNICAL FIELD

The present invention relates to a display control apparatus capable of processing images associated with positional information.

BACKGROUND ART

In recent years, digital still cameras and mobile terminals incorporating a camera which include a positioning unit utilizing a satellite positioning system (a global navigation satellite system (GNSS), for example) have been widely used. Such a device is capable of recording information on a photographing position associated with image data obtained by photographing. Furthermore, various personal computer applications utilizing image data associated with positional information obtained in this way have become popular. For example, PTL 1 discloses a technique of distinguishing image data having positional information recorded in attribute information of the image data from image data which does not have positional information to be recorded by displaying icons representing that the positional information is recorded in attribute information of image data to be displayed. However, although a result of a determination as to whether positional information is recorded in image data may be obtained in the method in the related art, accuracy of the positional information is not examined.

In general, a plurality of types of positioning methods of positional information have been used. For example, in a case of a digital still camera including a receiver which receives electric waves supplied from the satellite positioning system, under a condition in which the digital still camera may receive a signal from a satellite, positional information obtained by the signal is recorded as attribute information of image data. Furthermore, in a case of a digital still camera or a mobile terminal which includes a wireless LAN, positional information obtained from a nearest wireless base station may be recorded in image data. As another method, arbitrary positional information may be manually recorded using an operation unit in image data which does not include positional information recorded therein. In this case, wrong positional information may be input due to the manual operation.

Furthermore, when the satellite positioning system is used, since electric waves supplied from satellites are used, accuracy of positional information varies depending on an environment of the receiver and types, arrangement, the number of satellites, and the like.

As described above, a plurality of positional information may exist in terms of accuracy or reliability, and to examine the positional information, it is insufficient that presence and absence of positional information is simply determined.

CITATION LIST

Patent Literature

PTL 1: Japanese Patent Laid-Open No. 2007-323543

SUMMARY OF INVENTION

The present invention provides a display control apparatus including a storage unit configured to store image data associated with positional information, a determination unit configured to determine whether information representing a type of satellite used for determining the positional information associated with the image data stored in the storage unit is associated with the image data, and a display control unit configured to control, in accordance with a result of the determination performed by the determination unit, display of information representing a type of satellite used for determining the positional information associated with the image data in a form in which the type of satellite is recognizable.

Further features of the present invention will become apparent from the following description of exemplary embodiments with reference to the attached drawings.

Advantageous Effects of Invention

According to the present invention, the user may easily estimate accuracy or reliability of information on a photographing position.

BRIEF DESCRIPTION OF DRAWINGS

FIG. 1 is a block diagram illustrating a digital still camera according to a first embodiment.

FIG. 2 is a diagram illustrating a state of positioning utilizing satellites according to the first embodiment.

FIG. 3A is a diagram illustrating a configuration of an image file according to the first embodiment.

FIG. 3B is a diagram illustrating a configuration of the image file according to the first embodiment.

FIG. 4A is a diagram illustrating a screen displayed in a display unit of a digital still camera according to the first embodiment.

FIG. 4B is a diagram illustrating another screen displayed in the display unit of the digital still camera according to the first embodiment.

FIG. 4C is a diagram illustrating a further screen displayed in the display unit of the digital still camera according to the first embodiment.

FIG. 5 is a flowchart illustrating an operation of the digital still camera according to the first embodiment.

FIG. 6 is a flowchart illustrating another operation of the digital still camera according to the first embodiment.

FIG. 7A is a diagram illustrating a screen displayed in the display unit of the digital still camera according to the first embodiment.

FIG. 7B is a diagram illustrating another screen displayed in the display unit of the digital still camera according to the first embodiment.

FIG. 7C is a diagram illustrating a further screen displayed in the display unit of the digital still camera according to the first embodiment.

FIG. 8A is a diagram illustrating a screen displayed in the display unit of the digital still camera according to the first embodiment.

FIG. 8B is a diagram illustrating another screen displayed in the display unit of the digital still camera according to the first embodiment.

FIG. 8C is a diagram illustrating a further screen displayed in the display unit of the digital still camera according to the first embodiment.

FIG. 9 is a diagram illustrating a screen displayed in the display unit of the digital still camera according to the first embodiment.

FIG. 10 is a diagram illustrating a screen displayed in a display unit of a digital still camera according to a second embodiment.

FIG. 11A is a flowchart illustrating an operation of the digital still camera according to the second embodiment.

FIG. 11B is the flowchart illustrating the operation of the digital still camera according to the second embodiment.

FIG. 12A is a diagram illustrating a screen displayed in a display unit of a digital still camera according to a third embodiment.

FIG. 12B is a diagram illustrating another screen displayed in the display unit of the digital still camera according to the third embodiment.

FIG. 13 is a diagram illustrating a screen displayed in a display unit of a digital still camera according to a fourth embodiment.

DESCRIPTION OF EMBODIMENTS

Embodiments of the present invention will be described in detail hereinafter with reference to the accompanying drawings.

Note that the embodiments described below are merely examples of units for realizing the present invention, and the embodiments may be altered or modified depending on configurations of apparatuses to which the present invention is applied and various conditions. Furthermore, the embodiments may be appropriately combined with one another.

First Embodiment

Internal Configuration of Digital Still Camera 100

FIG. 1 is a block diagram illustrating a configuration of a digital still camera 100 which is an example of an image processing apparatus of a first embodiment. Although a digital still camera is taken as an example of an image processing apparatus in this embodiment, the image processing apparatus is not limited to the digital still camera. For example, an information processing apparatus, such as a cellular phone, a tablet device, and a personal computer, or an image pickup apparatus, such as a cellular phone incorporating a camera, may be employed as the image processing apparatus.

A controller 101 controls various units included in the digital still camera 100 in accordance with input signals or programs described below. Instead of the controller 101, portions of hardware may control the entire apparatus by sharing processes.

An image pickup unit 102 converts subject light which forms an image through a lens included in the image pickup unit 102 into an electric signal, performs a noise reduction process on the electric signal, and outputs resultant digital data as image data. The obtained image data is stored in a buffer memory, and thereafter, is subjected to a predetermined calculation performed by the controller 101 and stored in a recording medium 110.

A nonvolatile memory 103 which is an electrically removable and recordable nonvolatile memory stores the programs and the like described below to be executed by the controller 101.

A work memory 104 is used as a buffer memory which temporarily stores data on an image captured by the image pickup unit 102, an image display memory by a display unit 106, a work space of the controller 101, and the like.

An operation unit 105 accepts an instruction issued by a user to the digital still camera 100. The operation unit 105 includes operation members, such as a power supply button used by the user to instruct power-on or power-off of a power source of the digital still camera 100, a release switch used to instruct image capturing, and a reproduction button used to instruct reproduction of image data. Furthermore, a touch panel formed in the display unit 106 described below is also included in the operation unit 105. Note that the release switch includes switches SW1 and SW2. When the release switch is pressed halfway, the switch SW1 is turned on. By this, an instruction for performing image pickup preparation including an auto-focus (AF) process, an auto-exposure (AE) process, an auto while balance (AWB) process, and a flash pre-firing (EP) process is received. Furthermore, when the release switch is fully pressed, the switch SW2 is turned on. By this, an instruction for performing image capturing is received.

The display unit 106 performs display of a view-finder image at a time of image capturing, display of data on a captured image, display of characters used for an interactive operation, and the like. Note that it is not necessarily the case that the display unit 106 is included in the digital still camera 100. The digital still camera 100 is at least connected to the display unit 106 and at least has a function of controlling display of the display unit 106.

A position obtaining unit 108 performs positioning process. In the positioning process, a signal is received from a satellite and positional information representing a position of the digital still camera 100 is calculated from the received signal. In this embodiment, the positional information is represented by a coordinate of a longitude and latitude.

FIG. 2 is a diagram illustrating a state in which positioning is performed using a plurality of types of satellites. The position obtaining unit 108 is capable of performing positioning using a plurality of types of satellites including not only a GPS satellite 201 of the U.S. but also a GLONASS satellite 202 of Russia, a QZSS satellite (Michibiki) 203 of Japan, a Compass satellite 204 of China, a Galilean satellite 205 of Europe, and the like. Normally, a plurality of satellites are operated for each type, and accordingly, instead of use of a single satellite for each type as illustrated in FIG. 2, a plurality of satellites may be used for each type. Furthermore, depending on an area on the earth, some of the satellites may not perform positioning, and moreover, depending on an environment, such as an urban canyon, some satellites may not be used for positioning. Accordingly, types of satellites and the number of satellites used for positioning vary depending on a situation. In some cases, only one type of satellite is allowed to be used. Even in this case, if a plurality of satellites are available, positioning may be performed.

For example, it is assumed that, when positioning is performed in a flat land in a good radio wave condition in Japan, positioning is performed using 13 satellites in total, that is, seven GPS satellites, five GLONASS satellites, and one QZSS satellite. Since the number of satellites is sufficient, excellent positioning accuracy with an error of approximately 10 m or less may be obtained. On the other hand, when positioning is performed in an urban canyon, only four satellites in total, that is, three GPS satellites and one GLONASS satellite, may be used. In this case, an error of 100 m or more is generated as positioning accuracy, and accordingly, an exact location is not specified. Furthermore, different positioning accuracies of different types of satellites may be obtained since different types of satellites have different trajectory accuracies and different time accuracies. The types of satellites and the numbers of satellites are important information for estimation of positioning accuracy.

When performing positioning, the position obtaining unit 108 periodically transmits positional information in an NMEA format to the controller 101. The positional information includes information on types of satellites used for the positioning and information on the numbers of satellites for individual types. Even when positioning may not be performed owing to a poor radio wave condition, the positioning information is transmitted to the controller 101. In this case, information representing that positioning may not be performed is transmitted.

The controller 101 periodically stores the positioning information in the work memory 104. If the positioning information has been stored, the positioning information is updated. Accordingly, the work memory 104 stores the latest positional information at all time. The positional information stored as described above is read when image data is generated by image capturing performed by the image pickup unit 102, and recorded in a recording medium as information on an image capturing position along with the generated image data.

Note that the position obtaining unit 108 may have a function of obtaining positional information and date-and-time information from an external apparatus, such as abuse station of mobile phones, in addition to the function of receiving electric waves from satellites and performing positioning as described above. Alternatively, the position obtaining unit 108 may have a function of receiving a signal from a public wireless LAN access point and obtaining positional information in accordance with the signal. These functions may be individually realized by apparatuses or modules.

The recording medium 110 may record an image supplied from the image pickup unit 102. In this embodiment, images of an Exif-jpeg format are used. The recording medium 110 may be detachable from the digital still camera 100 or incorporated in the digital still camera 100. Specifically, the digital still camera 100 at least has a unit for accessing the recording medium 110.

Configuration of Image File

FIG. 3A is a diagram illustrating a configuration of an image file according to this embodiment. An image data file 300 includes an image header portion 301 which records information on image data and an image data portion 303 which is an image data body. The image header portion 301 includes a positioning information portion 302 which records information on a photographing position. Examples of the information on a photographing position include, in addition to a latitude, a longitude, an altitude, a date of positioning, and a time of positioning (a UTC time), types of satellites used for positioning and the numbers of satellites for individual types of satellites.

FIG. 3B is a diagram illustrating a data type and a data configuration of the positioning information portion 302. First, a flag representing whether positioning data is valid is stored in a leading portion of data in the positioning information portion 302. When the positioning data is invalid, values of subsequent data do not have validity. When die positioning data is valid, the values of the subsequent data have validity.

Immediately after the valid/invalid flag, azimuth-direction data is stored. The azimuth-direction data has two bytes and represents an azimuth-direction of photographing by a number in a range from 0 degree to 359 degrees at an interval of one degree while the north is set as 0 degree and the east is set as 90 degrees. Subsequently, altitude data of 4 bytes is stored. The altitude data may have a negative value. Thereafter, latitude data and longitude data are stored. The latitude data of 8 bytes and the longitude data of 8 bytes are represented by a geodetic system, such as WGS84. Furthermore, data on positioning date of 4 bytes and data on a UTC time of 4 bytes are stored. Subsequently, positioning method information representing a method for obtaining the information described above is stored. It is not necessarily the case that all the devices have a function of describing the positioning method information and some devices only describe point information in image data.

The positioning method information of this embodiment may have one of the following four types of values. First positioning method information corresponds to CELLID. CELLID is a positioning method using information on base stations of cellular phones. A current position is obtained from a cellular-phone base station by the following methods. For example, a position of a base station communicated with a cellular phone is set as a current position of the cellular phone, or a current position is estimated from a difference among arrival times of electric waves supplied from a plurality of base stations and positions where the base stations are installed.

Second positioning method information corresponds to WLAN. This positioning method utilizes a wireless LAN. A current position is obtained from the wireless LAN as follows. Electric waves are received from at least one wireless LAN access point, and a current position is estimated from intensity of the electric waves and a position where the access point is installed.

Third positioning method information corresponds to GPS. In this method, a current position of the apparatus itself is calculated by receiving information from a plurality of satellites as described with reference to FIG. 2. Although, in this embodiment, a case where a character string of "GPS" is employed as the positioning method information as a representative of methods utilizing satellites is described as an example, the positioning method information is not limited to this and any information may be used as long as the fact that die method utilizes satellites is recognizable.

Fourth positioning method information corresponds to MANUAL. This information generally represents that the user manually inputs positional information. Although considerably depending on implementation, the input of a value is performed when a latitude and a longitude are directly input or when a latitude and a longitude are input by specifying a specific portion in a map by a users operation.

In recent years, some cellular phones incorporating a camera perform so-called hybrid positioning such that a plurality of positioning methods are combined with one another so that point information of higher accuracy is obtained. In this case, information on all the used positioning methods is added to the positioning method information in this embodiment. Specifically, when the positioning information is determined in accordance with information on the GPS and information on an access point of the wireless LAN, positioning method information of "GPS WLAN" is obtained. In this embodiment, the positioning methods are described starting from the positioning method which contributes the determination of the positioning information in a larger degree. The degree of contribution is calculated in accordance with an amount of an error in the positioning and predetermined reliability of the positioning method. The example of "GPS WLAN" represents that a degree of contribution of the positioning method employing the GPS is larger than that of the positioning method employing the wireless LAN of cellular phones. In this embodiment, information on two positioning methods, that is, first positioning method information and second positioning method information, may be described. However, information on three or more positioning methods may be described.

Furthermore, when information representing that satellites are used is stored in the positioning method information, information on the numbers of satellites for individual types used for the positioning is stored in the positioning method information. Here, data on the GPS satellites, data on the GLONASS satellites, data on the QZSS satellites, data on the Galilean satellites, and data on the Compass satellites are stored. Each of the data has 1 byte, and when the data is zero, satellites corresponding to the data of zero are not used for the positioning.

Screen Display

Next, a method for displaying image data according to this embodiment will be described. FIG. 4A is a diagram illustrating a screen displayed in the display unit 106 when the apparatus enters a reproducing mode.

In FIG. 4A, image data Image1 to image data Image12 stored in the recording medium 110 are displayed as a list. These images are generated by the image pickup unit 102 or obtained from another digital still camera or a cellular phone through a connection unit 111. Alternatively, the images may be downloaded from a server or the like on a network through the connection unit 1. Furthermore, thumbnails of the image data may be used instead of bodies of the image data.

A display switching button 401 is used to change display of positional information. When the display switching button 401 is selected in a state of FIG. 4A, a screen of FIG. 4B is displayed. The selection is performed by accepting a touch on a region of the display switching button 401 through a touch panel disposed on the display unit 106, for example. Alternatively, the selection may be accepted when the display switching button 401 enters a selection state when a direction key, a dial, or the like included in the operation unit 105 is operated, and thereafter, in this state, a setting button is pressed.

As illustrated in FIG. 4B, an icon (hereinafter referred to as a "pin icon") having a shape of a pin overlaps with the thumbnails of the image data which is associated with positional information. Specifically, the pin icon is displayed for an image file having a positioning information portion. According to the example of this screen, latitude and longitude information is described as positional information in the image data Image1, Image3, Image4, Image6, Image7, Image8, Image10, and Image11. In this way, in the state of FIG. 4B, the image data associated with the positional information is displayed so as to be distinguished from the image data which is not associated with the positional information. It is not necessarily the case that the entire pin icon overlaps with the thumbnails and a portion of the pin icon may overlap with the thumbnails or the pin icon may be displayed beside the thumbnails of the image data as long as the image files having the positioning information portion and the image files which do not have the positioning information portion are distinguished from each other. In this screen, irrespective of the positioning method information, the pin icon overlaps with the image data having the latitude and longitude information. The user may easily recognize the image data including the positional information added thereto by checking this screen.

When the display switching button 401 is further selected in the state of FIG. 4B, a screen of FIG. 4C is displayed. As displayed in the screen of FIG. 4C, since different icons for the different positioning methods are displayed instead of the in icon, the positioning methods are distinguishable. For example, an icon (hereinafter referred to as a "satellite icon") representing satellites overlaps with the image data Image1, Image4, Image10, and Image11. The icon represents that the positioning method information of "GPS" is employed, that is, the image data has point information obtained using the satellites. Note that, in FIG. 4C, a satellite icon representing the GPS is displayed on the image data Image1 and Image10, a satellite icon representing the GLONASS is displayed on the image data Image4, and a satellite icon representing Michibiki is displayed on the image data Image11. Here, icons of satellites which make the most significant contribution to the positioning are displayed. As a criterion for determining the most significant contribution, the larger the number of satellites used for the positioning is, the more significant the contribution is. Note that, although use ranges of service of quasi-zenith satellites, such as the QZSS satellites (Michibiki) and the Compass satellites, are limited, the possibility of blocking of electric waves is comparatively low in the service ranges, and accordingly, accuracy is improved when compared with positioning performed only using the GPS and the GLONASS. Accordingly, when the quasi-zenith satellites are used for positioning, irrespective of the number of the satellites, an icon of the quasi-zenith satellites is displayed.

Furthermore, an icon (hereinafter referred to as a "wireless LAN icon") representing electric waves overlaps with the image data Image6 and Image8. The icon represents that the positioning method information of "WLAN" is employed, that is, the image data has point information obtained using the wireless LAN. An icon (hereinafter referred to as a "manual icon") representing a hand overlaps with the image data Image7. The icon represents that the positioning method information of "MANUAL" is employed, that is, the image data has point information manually obtained. A pin icon overlaps with the image data Image3. The pin icon represents image data which does not have positioning method information. Note that, in a case of image data having the positioning method information of "CELLID", an icon (hereinafter referred to as a "cell icon") which is different from the pin icon, the satellite icon, the wireless LAN icon, and the manual icon overlaps with the image data.

As described above, in the screen of FIG. 4C, the icons corresponding to the positioning methods overlap with the image data. Furthermore, when satellites are used, types of the used satellites are also displayed. By this, the user may easily recognize the methods for measuring the positioning information of the image data. Note that, when the display switching button 401 is selected in the displayed screen of FIG. 4C, the screen of FIG. 4A is displayed. Specifically, every time the display switching button 401 is selected, the three types of display screens are alternately displayed.

Operation of Digital Still Camera

Next, display of a list of images in the digital still camera 100 of this embodiment will be described with reference to FIG. 5. FIG. 5 is a flowchart illustrating an operation of the digital still camera 100 performed when images are displayed as a list. A process in the flowchart is started when the digital still camera 100 receives an instruction for entering a reproducing mode.

In step S501, the controller 101 analyzes image files stored in the recording medium 110 and displays thumbnails of the image files in the display unit 106 in a format of a list as illustrated in FIG. 4A. At this time, icons associated with positions are not displayed on the thumbnail images in an overlapping manner.

In step S502, the controller 101 determines whether the display switching button 401 has been selected. When detecting the selection of the display switching button 401, the controller 101 proceeds to step S503. In step S503, one of the displayed image data files is analyzed an that it is determined whether the image data file has a positioning information portion recorded therein. When it is determined that the image data file has a positioning information portion described therein, the process proceeds to step S504, and otherwise, the process proceeds to step S505. In step S504, the thumbnail of the image data in which the pin icon overlaps is displayed. This process is not performed on image data files which do not have a positioning information portion. This process is repeatedly performed until it is determined that all the display objects have been subjected to this process in step S505. After the process from step S503 to step S505 is performed, the screen of FIG. 4B is obtained.

In step S506, the controller 101 waits until the display switching button 401 is operated. When an operation on the display switching button 401 is detected, the process proceeds to step S507. In step S507, the controller 101 determines whether one of the displayed image data files has a positioning information portion recorded therein. When it is determined that the image data file has a positioning information portion recorded therein, the process proceeds to step S508, and otherwise, the process proceeds to step S509.

In step S508, the controller 101 displays an icon corresponding to a positioning method including the positioning information portion described therein such that the icon overlaps with the thumbnail of the corresponding image file. The display method will be described hereinafter. This process is not performed on the image files which do not include positioning information recorded therein. This process is repeatedly performed until it is determined that all the display objects have been subjected to this process in step S509.

The operation in step S508 of FIG. 5 will be described in detail hereinafter with reference to a flowchart of FIG. 6. Note that this operation is performed when a target image file has a positioning information portion.

First, in step S601, the controller 101 analyzes the target image file so as to determine whether the target image file includes a description of a positioning method. When the determination is affirmative, the process proceeds to step S602. On the other hand, when the determination is negative in step S601, the process proceeds to step S613.

In step S602, the controller 101 refers to positioning method information included in header information of the target image file so as to determine whether first positioning information (which is described at the beginning) of image data corresponding to the target image file represents "GPS", that is, whether a positioning method using satellites is employed. When the determination is affirmative, the process proceeds to step S603.

In step S603, the controller 101 reads the number of satellites used for positioning and determines whether quasi-zenith satellites are used for the positioning. In this embodiment, it is determined whether the QZSS satellites or the Compass satellites are used.

When the determination is affirmative in step S603, the process proceeds to step S604. In step S604, the controller 101 determines one of types of satellites which has the largest number of satellites used for the positioning as a type of satellite to be most preferentially displayed among the quasi-zenith satellites.

On the other hand, when the determination is negative in step S603, the process proceeds to step S605. In step S605, the controller 101 determines one of the types of satellites which has the largest number of satellites used for the positioning as a type of satellite to be most preferentially displayed.

When the operation in step S604 or step S605 is completed, the controller 101 displays an icon representing the determined type of satellite on a thumbnail image in an overlapping manner in step S606.

Furthermore, when the controller 101 determines that the positioning method is not "GPS" in step S602, the process proceeds to step S607. In step S607, the controller 101 determines whether the first positioning method information of the image data represents "WLAN", that is, whether the first positioning method of the image data uses a wireless LAN. When the determination is affirmative in step S607, the process proceeds to step S608. In step S608, instead of a pin icon, a wireless icon is displayed on the thumbnail of the target image file in an overlapping manner. On the other hand, when the determination is negative in step S607, the controller 101 proceeds to step S609.

In step S609, the controller 101 determines whether the first positioning method information of the image data represents "MANUAL", that is, whether point information of the image data is manually input. When the determination is affirmative in step S609, the process proceeds to step S610. In step S610, instead of the pin icon, a manual icon is displayed on the thumbnail of the target image file in an overlapping manner and the process proceeds to step S611. On the other hand, when the determination is negative in step S609, the controller 101 proceeds to step S611.

In step S611, the controller 101 determines whether the first positioning method information of the target image file represents "CELLID", that is, whether point information of the image data is input using a base station of cellular phones. When the determination is affirmative in step S611, the process proceeds to step S612. In step S612, instead of the pin icon, a cell icon is displayed on the thumbnail of the target image file in an overlapping manner. On the other hand, when the determination is negative in step S611, the process proceeds to step S613.

In step S613, a pin icon is displayed on the thumbnail of the target image file in an overlapping manner. Note that, when the determination is negative in step S611, it may be determined that a positioning information portion is recorded but an unrecognized positioning method is described. In this case, an icon representing the unrecognized positioning method may be displayed in an overlapping manner instead of the pin icon or overlapping display may not be performed. In this way, the screen illustrated in FIG. 4C may be displayed.

In the foregoing embodiment, every time the display switching button 401 is operated, a change from the display form of FIG. 4A, the display form of FIG. 4B, to the display form of FIG. 4C is looped. However, one of the displayed forms may be directly selected from a displayed menu and display may be performed in accordance with the selection. That is, the present invention is not limited to the example above.

Icon Operation

FIG. 7A is a diagram illustrating a screen displayed when a thumbnail (located on an upper left portion) of a certain image is specified (selected). As a specifying (selecting) method, a method for changing a selection object by operating an up-down-and-right-left key disposed in the operation unit 105 may be employed or a method for changing a selection object by detecting a touch on a display region of the thumbnail through the touch panel disposed on the display unit 106 may be employed. Furthermore, a state in which a cursor moved along with an operation of a pointing device, such as a mouse, is positioned in the thumbnail (or an icon on the thumbnail) may be determined as the specifying (selecting) state. In any way, when the certain thumbnail (Image1) is specified, detailed information 700 of a positioning information portion of the thumbnail is displayed. In the case of FIG. 7A, in addition to positional information obtained by signals supplied from satellites, information on the positioning using the satellites, such as types of satellites and the numbers of satellites used for the positioning, are displayed in the detailed information 700.

Instead of specifying of the thumbnail, a detection of a click operation performed on a portion of the satellite icon on the thumbnail or a positioning of a pointer, such as a mouse cursor, on the satellite icon may trigger the display of the detailed information 700. In this case, when a portion other than the satellite icon is clicked, image data of the thumbnail may be selected. This operation is similarly performed on the other icons.

Note that, when a selection of a high level, such as double click of the mouse or double tap of the touch panel, is performed on the icon, a screen of detailed display of metadata of the image may be displayed as illustrated in FIG. 7B, for example. On the other hand, when a region in the image other than the icon is specified, a screen of only the image is displayed as illustrated in FIG. 7C. By this, the user may easily display a desired screen. Note that switching between the screen associated with one image as illustrated in FIG. 7B or FIG. 7C and the screen displaying a plurality of images as a list as illustrated in FIG. 7A may be performed by pressing a button (a so-called "DISP. button") associated with display included in the operation unit 105, for example. In this case, every time the button associated with the display is pressed, the screens of FIG. 7A to FIG. 7C are alternately switched from one to another. Note that the switching function using the button may be incorporated along with the switching function using the icon.

FIG. 8A is a diagram illustrating a screen displayed when a designated thumbnail has the wireless LAN icon. In the example of FIG. 8A, detailed information 801 of a positioning information portion of the image data Image8 is displayed. In the detailed information 801, information associated with positioning using the wireless LAN, such as a latitude, a longitude, and an address of an access point of the wireless LAN, is displayed.

FIG. 8B is a diagram illustrating a screen displayed when a designated thumbnail has the manual icon. In the example of FIG. 8B, detailed information 802 of a positioning information portion of the image file Image7 is displayed. In the detailed information 802, in addition to a latitude and a longitude, a time when positional information is assigned to the image data is displayed.

FIG. 8C is a diagram illustrating a screen displayed when a designated thumbnail has the pin icon. In the example of FIG. 8C, detailed information 803 of a positioning information portion of the image file Image3 is displayed. For the pin icon representing that positioning method information does not exist, information on a latitude and a longitude is displayed.

FIG. 9 is a diagram illustrating a screen used to edit the icons. For example, the controller 101 displays an edit menu 900 having a plurality of edit items in response to a predetermined operation, such as an operation of moving a cursor onto the satellite icon and performing right click of the mouse or an operation of touching a display region of the satellite icon for a predetermined period of time or more. In the edit menu 900, three edit items, that is, "copy", "add", and "remove" are provided for editing the detailed information of the satellite icon and the positioning method information. When one of the edit items is specified, the controller 101 executes an edit process in accordance with the specified edit item. For example, when "copy" is selected, detailed information including point information, the number of GPS satellites, and positioning reliability and a positioning method which are recorded in the image data having the satellite icon on which the right click is performed may be copied in temporal storage memory (which is referred to as a "clip board" in general). When "remove" is selected, the detailed information including the positional information, the number of satellites, and positioning reliability and the positioning method which are recorded in the image data may be removed, and furthermore, the icon may be removed from the display screen. In a case where "add" is selected, only when "copy" is selected in an edit menu of an icon of another image data before "add" is selected, detailed information and a positioning method of the other image data serving as a copy source are added to the copy destination image data. Note that it is not necessarily the case that all the detailed information is added, and only the positioning method information may be added.

Furthermore, an icon representing a positioning method of the other image data serving as the copy source is additionally displayed on the copy destination image data. The detailed information added to the copy destination image data is recorded in MakerNote which is a tag of Exif2.3. The positioning method added to the copy destination image data is recorded in a first portion of a GPSProcessingMethod tag, and a positioning method originally recorded in the copy destination image data before the addition is recorded in a second portion of the GPSProcessingMethod tag. Thereafter, icon display is changed so that an icon representing a positioning method of significant contribution and a small icon representing a positioning method of insignificant contribution are displayed as described above.

Although the description above is made taking the satellite icon as an example, even when right click is performed on the wireless icon, the manual icon, or the pin icon, the same edit menu is displayed. Furthermore, when right click is performed on image data which does not include an icon in a state in which information on a certain icon is copied, only "add" is displayed in the edit menu. Here, when "add" is selected, detailed information including point information and positioning method information is added to the image data which is subjected to the right click. Note that it is not necessarily the case that all the detailed information is added, and only the positioning method information may be added.

As described above, in this embodiment, by referring to the positioning method information described as attribute information of the image data, the icon not only representing whether positioning information of the image exists but also representing a type of the positioning method is displayed on the thumbnail image in an overlapping manner. Since the image and the icon representing the type of the positioning method are displayed in the same screen, the user may easily recognize a positioning method for obtaining point information.

Second Embodiment

In the foregoing embodiment, an icon representing a type of positioning information is displayed on a thumbnail in an overlapping manner in accordance with a first positioning information method described in attribute information of an image file. In a second embodiment, when second positioning method information exists, the second positioning method information is also displayed.

FIG. 10 is a diagram illustrating display of an image list according to the second embodiment. In FIG. 10, an image file positioned in an upper left corner has positioning method information representing positioning performed using two positioning methods, that is, a GPS and a WLAN. Then, an icon having a first size representing a first positioning method "GPS" and an icon having a second size representing a second positioning method "WLAN" are displayed on a thumbnail such that the icons overlap with the thumbnail. The second size is smaller than the first size. The size of the icon of the second positioning method is small so that a region which hides the thumbnail image is reduced.

When the display screen of FIG. 10 is displayed as an example instead of FIG. 4C of the first embodiment, an operation of step S508 in FIG. 5 executed by a controller 101 is performed in accordance with a flowchart illustrated in FIGS. 11A and 11B. Note that, a process from step S1101 to step S1113 in the flowchart of FIG. 11A is the same as the process from step S601 to step S613 of FIG. 6. Hereinafter, a process in step S1114 onwards which is a unique operation of this embodiment will be described.

Note that, an icon of a positioning method has been displayed on a thumbnail image in an overlapping manner by a process performed by step S1113.

In step S1114, the controller 101 analyzes a positioning information portion of a target image file so as to determine whether a second positioning method has been recorded. When the determination is affirmative, the process proceeds to step S1115. On the other hand, when the determination is negative in step S1114, the process (a process in step S508) is terminated and the process proceeds to step S509 in the flowchart of FIG. 5.

In step S1115, it is determined whether the second positioning method information corresponds to "GPS", that is, whether a positioning method using satellites is employed. When the determination is affirmative, the process proceeds to step S1116.

In step S1116, the controller 101 reads the numbers of satellites used for positioning and determines whether quasi-zenith satellites are used for the positioning. In this embodiment, it is determined whether the QZSS satellites or the Compass satellites are used.

When the determination is affirmative in step S1116, the process proceeds to step S1117. In step S1117, the controller 101 determines one of types of satellites which has the largest number of satellites used for the positioning as a type of satellite to be most preferentially displayed among the quasi-zenith satellites.

On the other hand, when the determination is negative in step S1116, the process proceeds to step S1118. In step S1118, the controller 101 determines one of types of satellites which has the largest number of satellites used for the positioning as a type of satellite to be most preferentially displayed.

After the operation in step S1117 or step S1118 is completed, the process proceeds to step S1119. In step S1119, the controller 101 displays an icon which represents the determined type of satellite and which has a size smaller than the first icon in an overlapping manner in a portion near the icon of the first positioning method which has been displayed (in a portion beneath the first con in the example of FIG. 10). Then this process is terminated.

Furthermore, when the controller 101 determines that the positioning method is not "GPS" in step S1115, the process proceeds to step S1120. In step S1120, the controller 101 determines whether the first positioning method information represents "WLAN", that is, whether the first positioning method of the image data uses a wireless LAN. When the determination is affirmative in step S1120, the process proceeds to step S1121. In step S1121, the controller 101 displays a wireless icon which has a size smaller than the first icon in an overlapping manner in a portion near the icon of the first positioning method which has been displayed. Then this process is terminated. On the other hand, when the determination is negative in step S1120, the controller 101 proceeds to step S1122.

In step S1122, the controller 101 determines whether the first positioning method information of the image data represents "MANUAL", that is, whether point information of the image data is manually assigned. When the determination is affirmative in step S1122, the process proceeds to step S1123. In step S1123, the controller 101 displays a manual icon which has a size smaller than the first icon in an overlapping manner in a portion near the icon of the first positioning method which has been displayed. Then this process is terminated. On the other hand, when the determination is negative in step S1122, the controller 101 proceeds to step S1124.

In step S1124, the controller 101 determines whether the first positioning method information of the target image file represents "CELLID", that is, whether point information of the image data is assigned using a base station of cellular phones. When the determination is affirmative, the process proceeds to step S1125. In step S1125, the controller 101 displays a cell icon which has a size smaller than the first icon in an overlapping manner in a portion near the icon of the first positioning method which has been displayed. Then this process is terminated. On the other hand, when the determination is negative in step S1124, the process is terminated. Note that, when the determination is negative in step S1124, unrecognizable data (or unrecognized positioning information) may be described in the positioning method information. In this case, since the point information has been described, a pin icon is continuously displayed or an icon representing unrecognized positioning information is displayed in an overlapping manner.

The process of displaying icons corresponding to positioning methods on thumbnail images of image data in an overlapping manner according to the second embodiment has been described hereinabove.

Note that, although the display screen of 4C according to the first embodiment is replaced by the display screen of FIG. 10 in the second embodiment, the display screen of FIG. 10 may be displayed after a display switching button 401 included in the screen of FIG. 4C is operated.

Third Embodiment

In the foregoing embodiments, different icons are displayed depending on types of positioning methods described in attribute information of image files. However, in a third embodiment, a screen displayed in a state in which types of used satellites and the numbers of used satellites are recognizable when a positioning method using satellites is employed will be described.

FIGS. 12A and 12B are diagrams illustrating variation of display forms of satellite icons according to this embodiment. FIG. 12A is a diagram illustrating a display form in which all icons of satellites used for positioning are displayed. In this case, a type of satellite corresponding to the largest number of used satellites is displayed by a large icon. Other types of satellites are displayed by small icons, and sizes of the icons may be changed in accordance with the numbers of used satellites, for example. Specifically, the larger the number of used satellites is, the larger the icon is. Alternatively, a display order (display positions) may be changed in accordance with the numbers of used satellites. Specifically, a type having the larger number of used satellites is displayed on an upper side. FIG. 12B is a diagram illustrating a display form in which the numbers of satellites used for positioning are displayed. In this case, a type having the larger number of used satellites is displayed on an upper side.

The screens of FIG. 12A and FIG. 12B may be sequentially displayed after the display switching button 401 is operated in the screen of FIG. 4C, for example, every time the display switching button 401 is operated. Furthermore, the screens of FIG. 12A and FIG. 12B may be displayed when the display switching button 401 is specified by a method of a higher level, such as double click, double touch, or touch for a predetermined period of time or more performed on the display switching button 401 in the screen of FIG. 4C, for example. In this case, the screen in FIG. 12A and the screen in FIG. 12B are switched from one to another every time the display switching button 401 is specified by a method of a high level. When the display switching button 401 is specified by a method of a low level, the screen in FIG. 4A is displayed again or a screen displayed before the screen of FIG. 12A or FIG. 12B is entered is displayed. Since the screen of FIG. 12A and the screen of FIG. 12B are not included in a loop of switching between display forms specified by a method of a low level, the number of operation steps to be performed by a user who does not require detailed information to reach a desired display form may be reduced. Furthermore, for a user who requires detailed information, detailed information may be provided by a simple operation.

Fourth Embodiment

Hereinafter, an example of display of a map including detailed information of an image file and a photographing position according to a fourth embodiment of the present invention will be described with reference to FIG. 13.

When a user sets a map display mode, map image data including a photographing position of an image is displayed. Here, an image displayed here is associated with positional information representing a range of the map displayed by default, and is retrieved from a recording medium 110 when the display is started. Alternatively, a map in a predetermined raffle including an image which has been selected in a reproducing mode at a center may be displayed, and this state may correspond to a display mode which displays a photographing position of the image selected in the reproducing mode.

An example of the map display is illustrated in FIG. 13. In FIG. 13, a photographing position is indicated by a pin icon displayed on the map. Simultaneously, a balloon 1301 is displayed from the displayed pin icon, and the photographing image and image detailed information associated with the photographing image are displayed in the balloon 1301. Note that the balloon 1301 may be displayed in response to a certain user's instruction, such as click, double click, touch, double touch, or touch for a certain period of time or more performed on the pin icon.

As with the second embodiment, in a display portion of the image detailed information, information on a photographing position measured by GNSS satellites is displayed. In this portion, a latitude, a longitude, and an altitude are displayed from a top line, and thereafter, types of satellites used for positioning and the numbers of satellites are displayed for individual types. On the lowest line, a positioning date and a positioning time (a UTC time) are displayed.

By this, the user may recognize the types of satellites used for the positioning and the numbers of satellites for individual types of satellites in addition to the information on a photographing position. Since the map information is simultaneously displayed, even when the information on a photographing position is shifted from an actual position, the user may easily remember a location where the photographing is actually performed. In this case, when the types of satellites and the numbers of satellites are obtained, a degree of the shift of the position where the photographing is actually performed may be easily estimated, which is effective for remembering the photographing position.

As described above, according to the present invention, an image display apparatus capable of easily estimating accuracy and reliability of information on a position where photographing is performed may be provided since the types of satellites and the numbers of satellites for individual types of satellites are displayed in a visualized format for image files including positional information.

Other Embodiments

In the foregoing embodiments, any positioning method information may be used when satellites are used for positioning as long as the positioning method information represents that satellites are used for the positioning, and a case where a character string "GPS" is recorded is taken as an example. Furthermore, information representing a type of satellite which makes the most significant contribution for positioning, such as "GPS", "QZS", or "GLO", may be recorded. Furthermore, a plurality of types may be recorded as represented by "QZS GPS", for example. Moreover, different types of positioning methods may be recorded as represented by "WLAN QZS GPS", for example. In this case, the positioning methods are described in a descending order of a degree of contribution to the positioning. In a case of "QZS GPS", Michibiki contributes to the positioning, and in a case of "WLAN QZS GPS", information supplied from an access point contributes to the positioning.

The present invention may be realized when a program of at least one function of the foregoing embodiments is supplied to a system or an apparatus through a network or a storage medium and at least one processor included in the system or the apparatus reads and executes the program. Furthermore, the present invention may be realized by a circuit (an ASIC, for example) which realizes at least one function.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-025734, filed Feb. 13, 2014, which is hereby incorporated by reference herein in its entirety.

The invention claimed is:

1. A display control apparatus comprising:
one or more processors; and
one or more memories storing instructions that, when executed by the one or more processors, cause the display control apparatus to perform operations comprising:
storing image data associated with positional information;
determining whether information representing a type of satellite used for determining the positional information associated with the stored image data is associated with the image data; and
controlling, in accordance with a result of the determination performed by the determining, display of information representing a type of satellite used for determining the positional information associated with the image data in a form in which the type of satellite is recognizable,
wherein the determination is performed when the display control apparatus is in a reproducing mode.

2. The display control apparatus according to claim 1, wherein when a plurality of types of satellites are used for determining the positional information, the types of satellites are displayed in descending order of the numbers of satellites used for determining the positional information.

3. The display control apparatus according to claim 1, wherein
when quasi-zenith satellites are included in the satellites used for determining the positional information, information representing a type of the quasi-zenith satellites is preferentially displayed when compared with types of other satellites.

4. The display control apparatus according to claim 1, wherein
the determining further determines whether positioning method information representing a method for determining the positional information associated with the stored image data is associated with the image data, and whether the positioning method information indicates that the positional information is determined using satellites, and
the determination as to whether the information representing a type of satellite is associated with the image data is made after it is determined that the positioning method information indicates that the positional information is determined using satellites.

5. The display control apparatus according to claim 4, wherein
the controlling controls, in accordance with a result of the determining, display such that the positioning method information representing the method for determining the positional information associated with the image data is displayed in a screen along with the image data in a state in which a type of the method for determining the positional information is recognizable.

6. The display control apparatus according to claim 4, wherein
the storing stores even image data which is not associated with the positional information, and
the controlling controls display of the image data associated with positional information and the image data which is not associated with positional information such that the image data associated with positional information and the image data which is not associated with positional information are distinguished from each other.

7. The display control apparatus according to claim 4, wherein
when a plurality of positioning method information is associated with the image data, the controlling performs control such that a plurality of icons corresponding to the positioning method information are displayed.

8. The display control apparatus according to claim 1, wherein
the controlling performs control such that at least some of a plurality of image data stored in the storage unit are displayed as a list.

9. The display control apparatus according to claim 1, wherein the operations performed by the display control apparatus further comprise:
capturing a subject and generating image data,
wherein the storing stores the image data generated by the capturing.

10. The display control apparatus according to claim 1, wherein the operations performed by the display control apparatus further comprise:
receiving image data associated with positional information from an external apparatus,
wherein the storing stores the received image data.

11. A method for controlling a display control apparatus, the method comprising:
storing image data associated with positional information;
determining whether information representing a type of satellite used for determining the positional information associated with the stored image data is associated with the image data; and
controlling, in accordance with a result of the determination, display of information representing a type of satellite used for determining the positional information associated with the image data in a form in which the type of satellite is recognizable,
wherein the determination is performed when the display control apparatus is in a reproducing mode.

12. A non-transitory computer readable storage medium which stores one or more programs which, when executed, cause a computer to perform a process, the process comprising:

storing image data associated with positional information;
determining whether information representing a type of satellite used for determining the positional information associated with the stored image data is associated with the image data; and
controlling, in accordance with a result of the determination, display of information representing a type of satellite used for determining the positional information associated with the image data in a form in which the type of satellite is recognizable,
wherein the determination is performed when the display control apparatus is in a reproducing mode.

* * * * *